United States Patent
Williams et al.

(10) Patent No.: US 9,277,123 B2
(45) Date of Patent: Mar. 1, 2016

(54) SYSTEMS AND METHODS FOR EXPOSURE METERING FOR TIMELAPSE VIDEO

(71) Applicant: Apple Inc., Cupertino, CA (US)

(72) Inventors: George E. Williams, Pleasanton, CA (US); Geoffrey T. Anneheim, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 14/292,547

(22) Filed: May 30, 2014

(65) Prior Publication Data

US 2015/0350544 A1 Dec. 3, 2015

(51) Int. Cl.
*H04N 5/232* (2006.01)
*H04N 5/235* (2006.01)
*H04N 5/265* (2006.01)
*H04N 19/90* (2014.01)

(52) U.S. Cl.
CPC .......... *H04N 5/23245* (2013.01); *H04N 5/2353* (2013.01); *H04N 5/265* (2013.01); *H04N 19/90* (2014.11)

(58) Field of Classification Search
CPC .......... H04N 5/23222; H04N 5/23293; H04N 5/23245; H04N 5/2351; H04N 5/265; H04N 5/2353; H04N 19/90
See application file for complete search history.

(56) References Cited

U.S. PATENT DOCUMENTS

| | | | |
|---|---|---|---|
| 5,867,214 A | 2/1999 | Anderson | |
| 7,295,230 B2 | 11/2007 | Takahashi | |
| 7,450,162 B2 * | 11/2008 | Shioji | H04N 5/772 348/231.2 |
| 7,499,588 B2 | 3/2009 | Jacobs | |
| 7,990,430 B2 | 8/2011 | Okamoto | |
| 8,118,216 B2 | 2/2012 | Hoch | |
| 8,194,993 B1 * | 6/2012 | Chen | G06T 5/006 348/231.6 |
| 8,340,453 B1 * | 12/2012 | Chen | G06T 5/002 382/254 |
| 8,515,270 B1 * | 8/2013 | Posehn | G03B 15/00 396/48 |
| 8,657,988 B2 * | 2/2014 | Fan | B82Y 30/00 156/167 |
| 8,681,237 B2 * | 3/2014 | Battles | G03B 7/00 348/222.1 |
| 8,711,495 B2 | 4/2014 | Topliss | |
| 8,830,347 B2 * | 9/2014 | Jin | G06K 9/3275 348/222.1 |
| 8,866,928 B2 * | 10/2014 | Geiss | H04N 5/335 348/222.1 |
| 9,077,910 B2 * | 7/2015 | Ninan | H04N 5/2355 |
| 2007/0189728 A1 | 8/2007 | Yu | |
| 2008/0253758 A1 * | 10/2008 | Yap | G03B 7/08 396/234 |
| 2009/0237502 A1 * | 9/2009 | Maiya | G02B 21/367 348/79 |
| 2010/0215348 A1 * | 8/2010 | Saito | H04N 5/2355 386/224 |
| 2012/0257071 A1 | 10/2012 | Prentice | |
| 2013/0063584 A1 | 3/2013 | Nakasho | |
| 2013/0202185 A1 | 8/2013 | Irwin | |
| 2013/0215289 A1 | 8/2013 | Vitsnudel | |
| 2013/0308036 A1 * | 11/2013 | Peng | H04N 5/23212 348/345 |
| 2014/0052636 A1 | 2/2014 | Mattes | |
| 2014/0085495 A1 | 3/2014 | Almalki | |
| 2014/0105564 A1 | 4/2014 | Johar | |
| 2014/0362247 A1 * | 12/2014 | Fujita | H04N 5/2356 348/222.1 |
| 2015/0043893 A1 * | 2/2015 | Nishizaka | G11B 27/005 386/278 |
| 2015/0086176 A1 * | 3/2015 | Komiya | H04N 5/2353 386/226 |
| 2015/0215537 A1 * | 7/2015 | Nishizaka | H04N 5/23245 348/220.1 |
| 2015/0294686 A1 * | 10/2015 | Autioniemi | G11B 27/036 386/285 |
| 2015/0312463 A1 * | 10/2015 | Gupta | H04N 5/23254 348/239 |

\* cited by examiner

*Primary Examiner* — Roberto Velez
*Assistant Examiner* — Tuan Le
(74) *Attorney, Agent, or Firm* — Blank Rome LLP

(57) ABSTRACT

Techniques and devices for acquiring and processing timelapse video are described. The techniques use exposure bracketing to provide a plurality of images at each acquisition time. Images of the plurality are selected to minimize flicker in a timelapse video encoded from the selected images.

16 Claims, 4 Drawing Sheets

SYSTEMS AND METHODS FOR EXPOSURE METERING FOR TIMELAPSE VIDEO

CROSS-REFERENCE TO RELATED APPLICATIONS

This disclosure is related to the subject matter of commonly-assigned U.S. patent application Ser. No. 14/292,316, entitled, "System and Methods for Time Lapse Video Acquisition and Compression," which was filed on May 30, 2014 ("the '316 application").

BACKGROUND

This disclosure relates generally to the field of video capture, and more particularly, to exposure metering while acquiring timelapse video.

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through WiFi, LTE, HSDPA and other cell-based or wireless technologies. The wide proliferation of these integrated devices provides opportunities to use the device's capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using firmware and/or software (e.g., "Apps") and a user interface including the touch-screen fixed buttons and touchless control such as voice control.

The integration of cameras into communication devices such as smartphones and tablets has enabled people to share images and videos in ways never before possible. It is now very popular acquire and immediately share photos with other people by either sending the photos via text message, SMS, or email, or by uploading the photos to an internet-based website, such as a social networking site or a photo-sharing site.

It is desirable in some circumstances to capture video for very long periods of time, spanning a period from several minutes up to several days, and to speed up the playback of those videos so that the viewer can see all the action that took place in a short span of time, say twenty to forty seconds. This is often referred to as a timelapse video. Thus, methods of dramatically speeding up playback of a timelapse video, while still producing video having a pleasing look, are needed.

SUMMARY

Disclosed herein are devices and methods for acquiring timelapse video. In timelapse video, images are captured at a frame rate (usually expressed in frames per second, "fps") that is lower than the frame rate at which they are played back. Playing the captured frames back at a higher rate than they were captured at results in the timelapse effect that is familiar to most people. For example, images of a blooming flower may be captured over a period of a few days or weeks at a frame rate of a frame per hour. The flower will appear to bloom in a matter of seconds when the images are played back at a rate of 30 fps. Likewise, a sunset may be recorded at a frame rate of a few frames per minute and played back at normal frame rate to provide 20 second clip of the entire sunset.

As images are acquired over extended periods of time, conditions such as ambient light may change. For instance, in the flower example, the ambient light changes as the day passes and some days may be brighter than others. Many cameras include an auto-exposure (AE) feature that automatically sets exposure parameters such as shutter speed, aperture setting, image sensor sensitivity, white balance and the like, based on light conditions. The camera's AE feature adjusts the exposure parameters during filming of video images to account for changes in ambient conditions. When filming at normal frame rates, for example, 30 fps, ambient conditions typically do not change a great amount between subsequent images because the duration between subsequent images is so small. Thus, only small incremental adjustments to the exposure parameters are required between subsequent images.

When recording timelapse video, images are acquired less frequently and ambient conditions may change a great deal between subsequent images. Consequently, the camera's AE function may make greater changes to the exposure parameters between subsequent images. When sequential images having significantly different exposure parameters are played back at a high frame rate, a strobe-like artifact, referred to as flicker, can be introduced into the played back video.

The methods and devices described herein reduce or prevent the flicker effect in timelapse video. The method involves capturing a bracket of images for each capture time, each image having different exposure values. Once images are captured for the entire duration, single images are selected from each bracket and encoded to form the timelapse video. The images in each bracket are selected to minimize abrupt changes in exposure parameters from image to image, thereby minimizing flicker in the timelapse video.

DESCRIPTION

Figure 1:
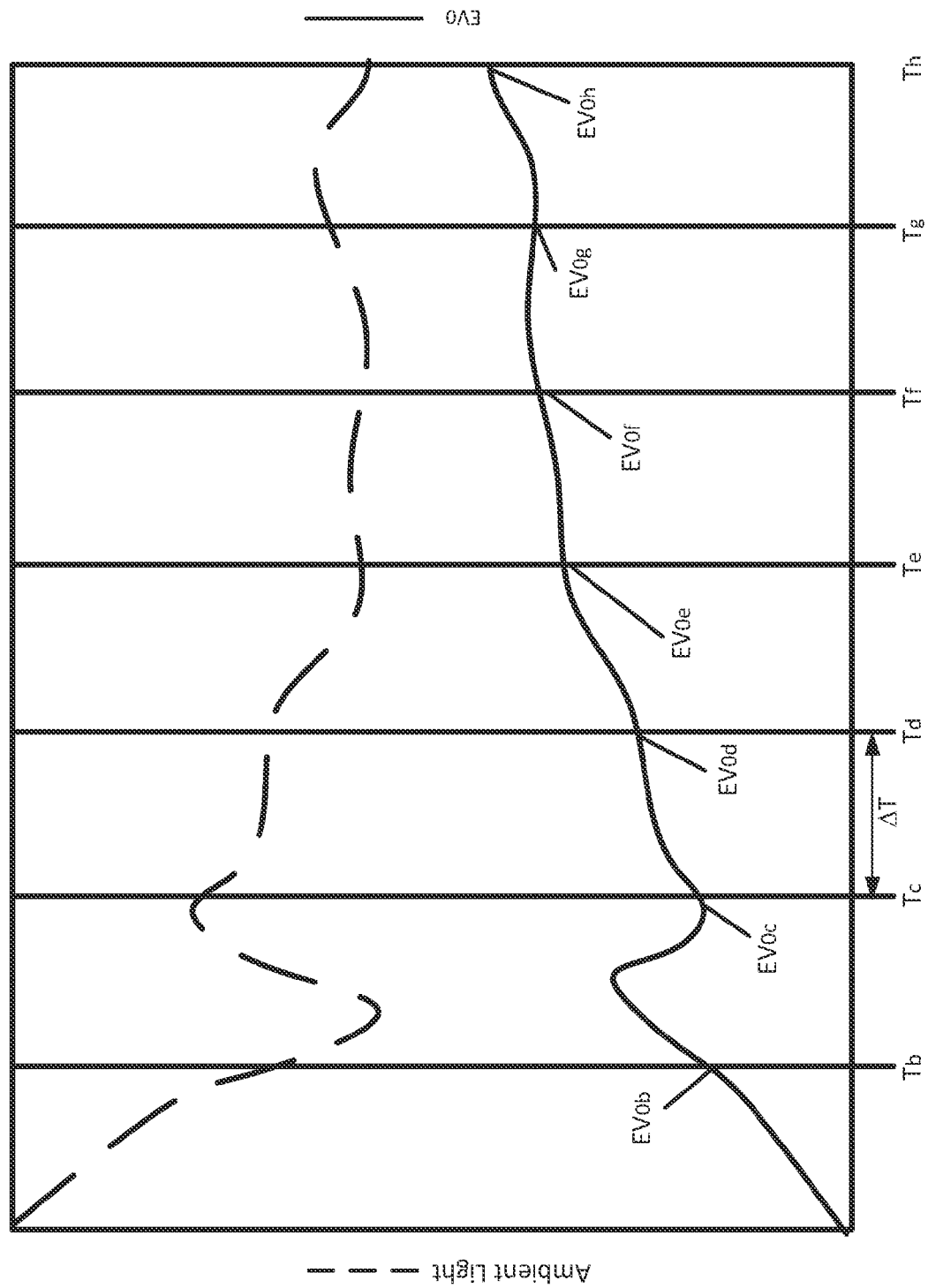
FIG. 1 illustrates changing light conditions and changing relative exposure values during video recording.

Systems, methods and program storage devices are disclosed, which provide instructions to cause one or more processing units to record timelapse video. The techniques disclosed herein are applicable to any number of electronic devices with displays: such as digital cameras, digital video cameras, mobile phones, personal data assistants (PDAs), portable music players, monitors, and, of course, desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Timelapse is realized by playing a series of images back at a faster frame rate (referred to herein as the "playback frame rate") than the rate at which those images were acquired (referred to herein as the "acquisition frame rate). For the discussion that follows the playback frame rate will always be assumed to be 30 fps, though playback can be at any rate, for example 60 fps. As an example, source video captured for 40 seconds at an acquisition frame rate of 15 fps yields 600 images. Playing those 600 images back at a playback frame rate of 30 fps yields 20 seconds of timelapse video. To create a 20 seconds timelapse video of events spanning a longer duration, an even slower acquisition frame rate is needed. For example, 80 seconds of source video captured at an acquisition frame rate of 7.5 fps to yield 600 images that could be played back at 30 fps to provide 20 seconds of timelapse video. Producing 20 seconds of timelapse video from source video acquired for 48 hours would require an acquisition of one frame about every five minutes (again, assuming a 30 fps playback rate).

A problem arises if a user does not know ahead of time how long they will be acquiring source video because they can not know what acquisition frame rate is required to provide the appropriate number of images to compose the time lapse clip. A solution to that problem is to acquire the source video at an adequately high frame rate and then, when acquisition is complete, discard as many frames as necessary to yield an appropriate "effective frame rate." For example, a method of reducing a 40 second clip of source video to 20 seconds of timelapse video would be to: (1) acquire source video for 40 seconds at an acquition frame rate of 30 fps, yielding 1200 images; (2) discard half of the images (for example, discard every other image), yielding 600 images total; and (3) play the remaining 600 images back at 30 fps, yielding 20 seconds of timelapsed video. Because half of the images are discarded, the acquisition frame rate is "effectively" 15 fps, even though the video was actually acquired at 30 fps. Thus, the term "effective acquisition frame rate" is used herein to refer to the number of images remaining divided by the true acquisition time. When played back at 30 fps, the action in the video will appear to move at twice the speed as the "true-to-life" action. To create 20 seconds of timelapse video from a longer segment of source video, more images would have to be discarded. For example, 80 seconds of source video recorded at 30 fps would yield 2400 images. Discarding 1800 of those images (i.e., keeping every fourth image) would leave 600 images, again providing 20 seconds of timelapse video for playback at 30 fps. As the length of time source video is acquired increases, the number of images that are discarded to yield the timelapse video also increases.

Commonly owned patent application Ser. No. 14/292,316, filed concurrently herewith, describes an adaptive algorithm for acquiring and processing timelapse video. The entire contents of patent application Ser. No. 14/292,316 are incorporated herein by reference. Briefly, the algorithm works by periodically discarding a portion of the acquired images and also periodically decreasing the acquisition frame rate as images are acquired for timelapse playback. For example, acquisition may proceed at an acquisition frame rate of 30 fps for 40 seconds, yielding 1200 images. At that time, half of the images are discarded, leaving retained 600 images (i.e., providing an effective acquisition frame rate of 15 fps). Also at that time, the true acquisition frame rate is reduced from 30 fps to 15 fps. Images are acquired at 15 fps and stored along with the originally collected 600 images. Once the total number of saved images reaches 1200, the process repeats. Again, half of the images are discarded, leaving 600 retained images, now with an effective acquisition frame rate of 7.5 fps. The true acquisition frame rate is again decreased to match the effective acquisition frame and acquisition continues. The adapted algorithm results in a plurality of images, each having the same effective acquisition frame rate and the frame rate is adaptively adjusted depending on the length of time over which images are captured. The method allows a user to capture source video for time lapse playback even if the user does not know ahead of time how long the source video will be.

A consequence of the adaptive adjustment described above is that the final sequence of images is not predictable at the outset. In other words, even though images are acquired in sequence, it cannot be known ahead of time which images will be discarded and which will be retained. Thus, the final sequence of images, as well as the final effective frame rate, is unknown at the outset. For example, consider source video recorded as a series of images 1, 2, 3, 4, 5, 6, 7, 8, 9, . . . . After multiple iterations of the adaptive algorithm, the remaining images may be 1, 5, 9, . . . . The fact that images 1 and 5 would be sequential in the final set of images could not have been predicted from the outset.

Since the effective frame rate and the identity of the actual images that will comprise the final timelapse video are not known in advance, selecting the optimum exposure values for each image at acquisition time is not possible. The reasons for the difficulty will be explained below. The methods described herein for adjusting exposure values are ideally suited for use with the adaptive algorithm described in patent application Ser. No. 14/292,316 wherein the effective acquisition frame rate is unknown until acquisition is completed.

FIG. 1 graphically illustrates changing ambient conditions and autoexposure parameters during acquisition of timelapse video in a situation where ambient light intensity, represented by dashed line 101, gradually decreases over time. For example, a user may be acquiring timelapse images of a sunset. Time is represented on the horizontal axis. Generally, ambient light conditions do not change abruptly, so dashed line 101 is essentially smooth and continuous.

Solid line 104 represents the relative exposure determined by the camera's AE feature. "EV" stands for exposure value and represents a combination of the camera's shutter speed, aperture, and sensor sensitivity. $EV_0$ is the EV value calculated by the camera's AE algorithm to provide the optimum quality of image. When ambient light intensity decreases, the camera's AE algorithm calculates a higher exposure value (EV) to compensate for the lower light intensity. The details of the camera's AE algorithm are not critical for understanding the disclosed timelapse method. Moreover, AE methods are known in the art. Briefly, the camera's sensor samples an image and the camera's processors analyze portions of the image and calculate an average brightness ($AE_{avg}$) of the image based on those locations. The AE algorithm adjusts the camera's EV values, attempting maintain $AE_{avg}$ at a target value, $AE_{Target}$. The adjustments are not instantaneous, however. For both aesthetic and technical reasons, an amount of time, referred to as a convergence time ($t_c$), is required for the parameters to converge to the calculated $EV_0$ values. When images are acquired at a high frame rate for video playback, the $t_c$ value limits the amount the EV value can change from frame to frame. As a result, the true EV values tend to lag behind the target when lighting conditions change. Since light intensity does not change significantly from instant to instant, neither does the relative exposure value. At high acquisition frame rates, the calculated $EV_0$ value does not typically change abruptly from image to image. Thus, solid line 104 is also typically a smooth and continuous curve.

Figure 2:
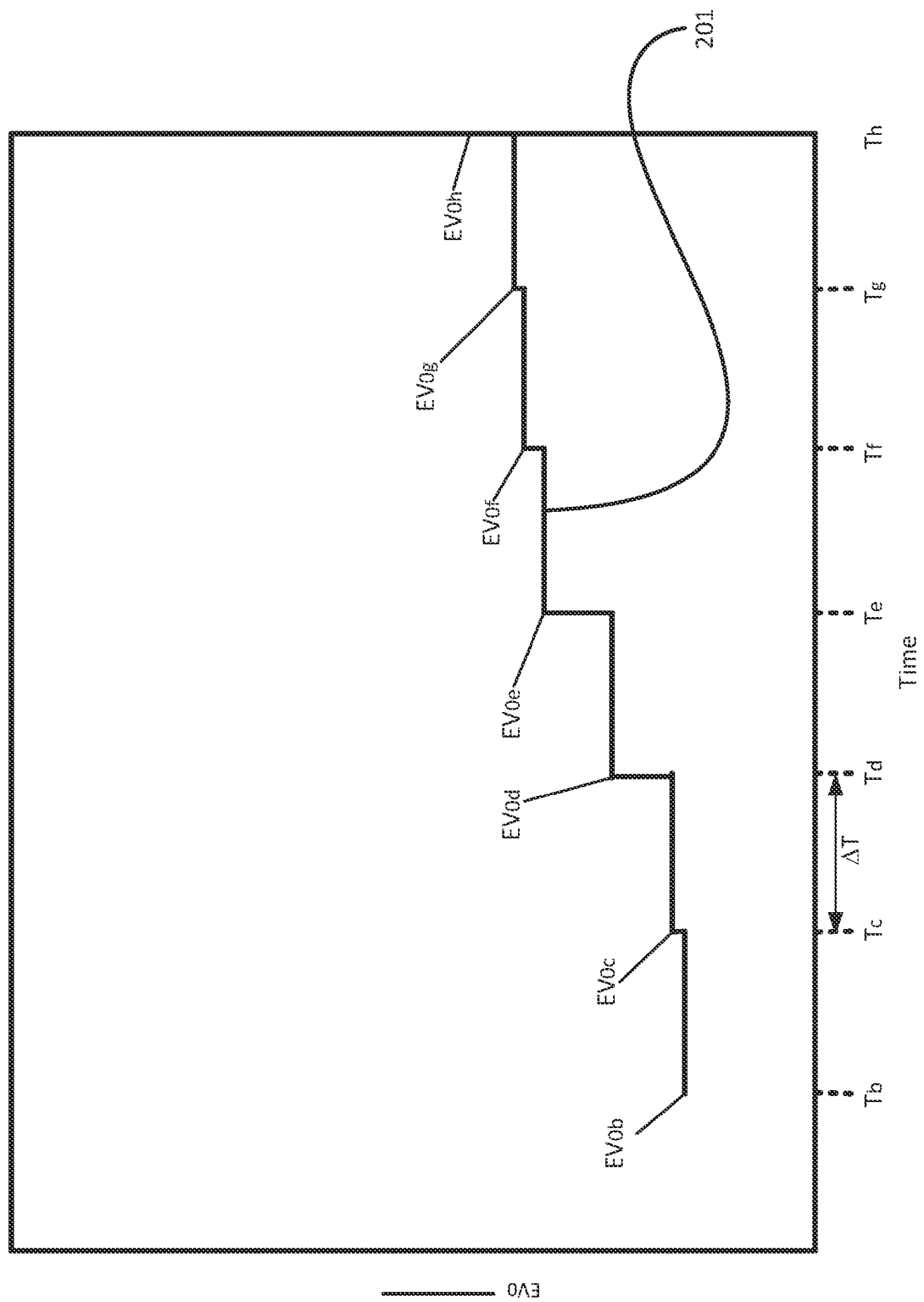
FIG. 2 illustrates calculated relative exposure changes during recording of timelapse video.

The situation can be different, however, when the effective frame rate is lower. Consider a set of images having an effective acquisition frame rate (R), and an associated image capture time interval (the time between image captures) $\Delta T=1/R$ (102). FIG. 1 illustrates $\Delta T=Tc-Td$ (103c and 103d, respectively). As illustrated, the time interval is long compared to the changing light intensity and the changing calculated $EV_0$. This may be the situation when the effective acquisition frame rate is low and/or images captured at times between Tc and Td have been discarded, as in the adaptive algorithm described above. In those situations the calculated $EV_0$ values between subsequent image captures can vary abruptly. As illustrated in FIG. 2, the function 201 describing those $EV_0$ values is not continuous, but is instead a step function and the changes in $EV_0$ between subsequent frames can be quite large because the intervening images over which the $EV_0$ value would have been gradually adjusting are not present. For example, the change from $EV_{0c}$ to $EV_{0d}$ in FIG. 2 is quite abrupt. When the images are played back at high speed the abrupt changes in $EV_0$ values result in the flicker effect mentioned above.

Figure 3:
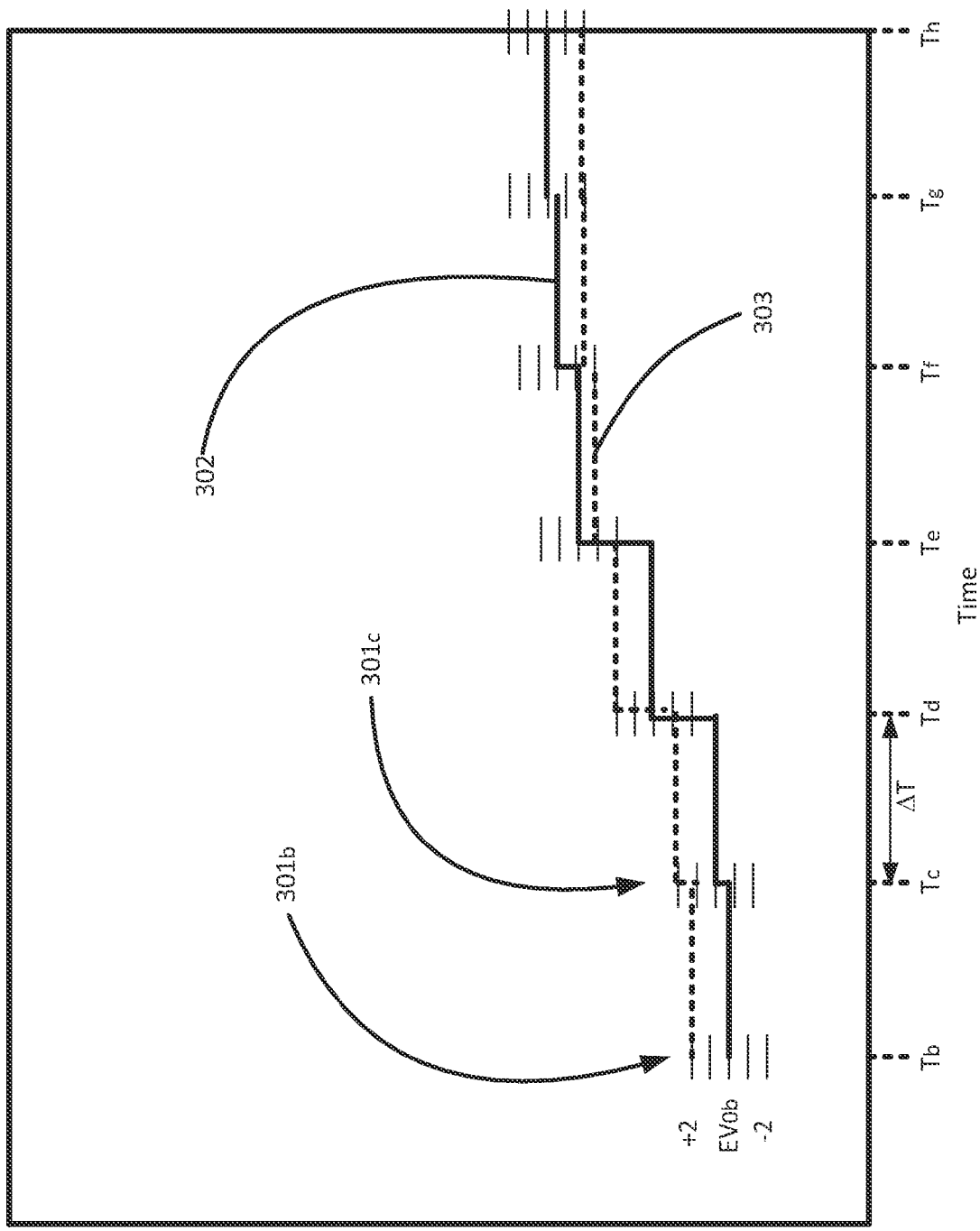
FIG. 3 illustrates using an exposure bracket at each acquisition time to select images having locally similar exposure values to provide timelapse video without flicker and with smooth exposure changes.

FIG. 3 illustrates a method of reducing the flicker effect caused by significant changes in $EV_0$ values from image to image. At each acquisition time $t_n$, a bracket of images are acquired. Each image of the bracket is acquired using a different EV, yielding a set of images with different relative exposure 301. For example, one image may be acquired using the calculated $EV_0$ value and other images in the bracket may be acquired using EV values greater and less than the calculated $EV_0$ value. A bracket of five EV values 301, corresponding to a bracket of five images, is illustrated in FIG. 3. However, the bracket may comprise any number of images, with the caveat that the number of images is limited by the storage capacity of the device.

Once image acquisition is completed, the images in the brackets are analyzed and an image from each bracket is selected to compose the timelapse video clip. The images are selected on a basis of an image quality, such as average brightness, $AE_{Avg}$. The $AE_{Avg}$ values are selected to yield sequences of images for which the flicker effect is reduced or eliminated when the images are played back at a high frame rate. Further, additional gain may be applied to compensate for any remaining differences between adjacent images. This technique is necessary if the number of images in the bracket is reduced to lessen the storage requirements.

In FIG. 3 curve 302 is the step function corresponding to each of the $EV_0$ values (i.e., the same curve represented as 201 of FIG. 2). Curve 303 was drawn by selecting an image from each bracket to minimize changes in the selected EV value from each image to the next. Video encoded from the images corresponding to curve 303 has less flicker than video encoded from the images corresponding to curve 302.

Given a collection of brackets of images with a range of EV values, it is within the ability of a person of skill in the art to arrive at an algorithm for selecting images from each bracket to render a timelapse video. One simple algorithm is to analyze the $AE_{Avg}$ of each image and then select the images from each bracket that provide the smoothest fit of $AE_{Avg}$ from image to image. An alternative method can be based on an effective convergence time tc calculated based on the playback rate of the video. An effective convergence time can be specified as a maximum change in exposure from image to image during playback of the final collection of images, or as the amount of time in playback for exposure to reach it's target after a change in lighting conditions in the scene. For example, if the playback rate is to be 30 fps, the interval $\Delta T$ between frames during playback will be about 30 msec. The algorithm will try to select images that satisfy the specified effective convergence time criteria. If multiple images in a bracket can meet the criteria, then the image with the $AE_{Avg}$ value closest to the calculated $AE_{Target}$ can be selected.

It should be noted that the methods described herein can be implemented based on image parameters other than AE (and EV) values. For example, the methods can be used to optimize image parameters such as color values, white balance, focus, and the like.

Once the appropriate image has been selected from each bracket, the images encoded into a movie clip according to a video encoding format, such as one of the MPEG formats. It will be appreciated that other encoding formats, such as HEVC, Dirac, RealVideo, etc., can be used, as known in the art.

Figure 4:
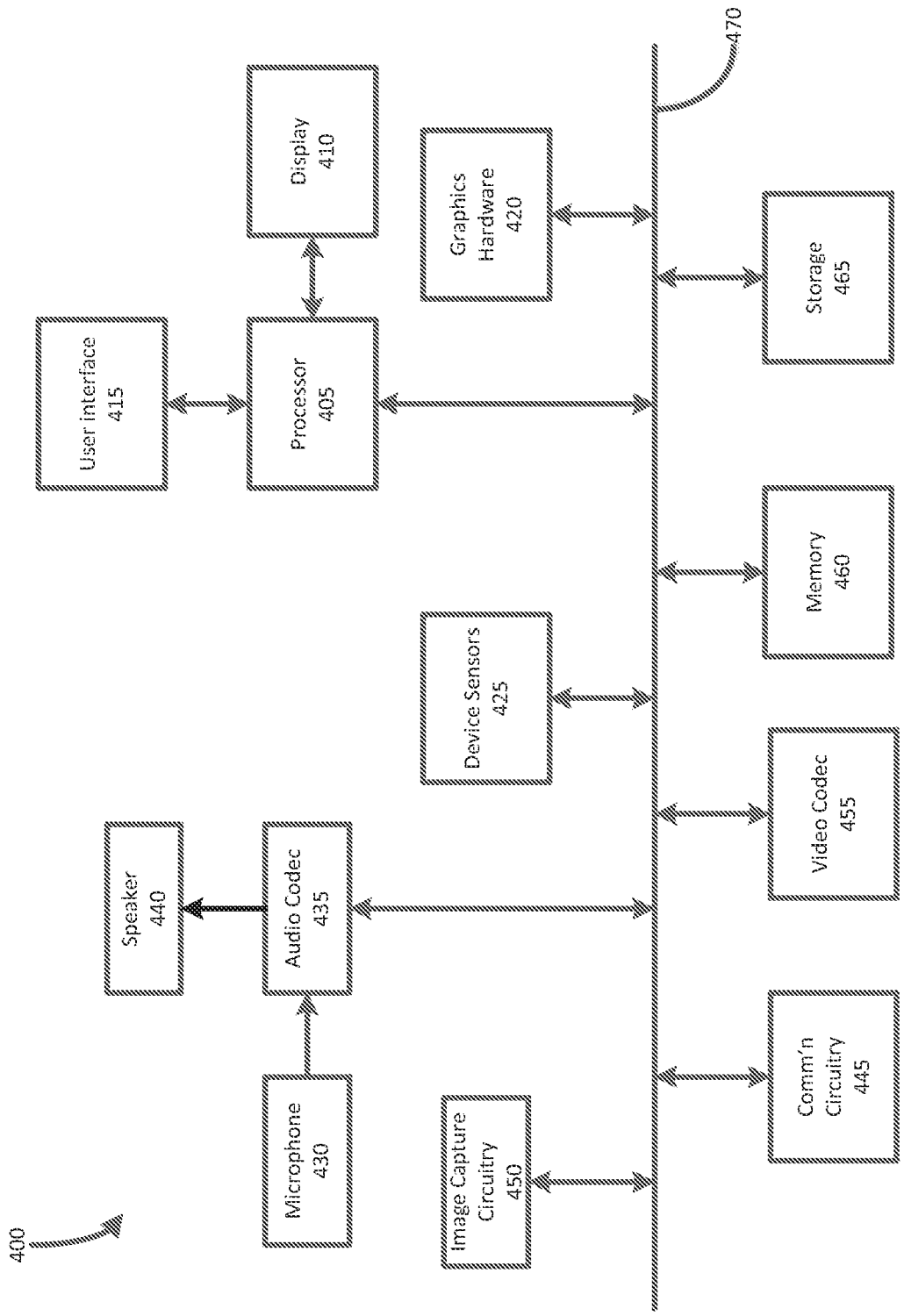
FIG. 4 illustrates an exemplary electronic device for capturing and processing timelapse video.

FIG. 4 is a block diagram schematically illustrating an embodiment of an apparatus for performing the methods described herein. Electronic device 400 may include processor 405, display 410, user interface 415, graphics hardware 220, device sensors 225 (e.g., proximity sensor/ambient light sensor, accelerometer and/or gyroscope), microphone 430, audio codec(s) 435, speaker(s) 440, communications circuitry 445, digital image capture unit 450, video codec(s) 455, memory 460, storage 465, and communications bus 470. Electronic device 400 may be, for example, a personal digital assistant (PDA), personal music player, a mobile telephone, or a notebook, laptop or tablet computer system.

Processor 405 may execute instructions necessary to carry out or control the operation of many functions performed by device 400. Processor 405 may, for instance, drive display 410 and receive user input from user interface 415. User interface 415 can take a variety of forms, such as a button, keypad, dial, a click wheel, keyboard, display screen and/or a touch screen. Processor 405 may be a system-on-chip such as those found in mobile devices and include a dedicated graphics processing unit (GPU). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 process graphics information. In one embodiment, graphics hardware 420 may include a programmable graphics processing unit (GPU).

Sensor and camera circuitry 450 may capture still and video images that may be processed to generate images in accordance with this disclosure. Output from camera circuitry 450 may be processed, at least in part, by video codec(s) 455 and/or processor 405 and/or graphics hardware 420, and/or a dedicated image processing unit incorporated within circuitry 450. Images so captured may be stored in memory 460 and/or storage 465. Memory 460 may include one or more different types of media used by processor 405, graphics hardware 420, and image capture circuitry 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405 such computer program code may implement one or more of the methods described herein.

Referring again to FIG. 3, each image of each bracket of images is typically saved according to an image compression method, such as JPEG compression. Because at a various times during operation of the adaptive method of timelapse image capture, it is not predetermined which image images will be the final set of images at the end of the operation, it is generally difficult to begin encoding video until filming is completed and the final set of images is determined. As such, images are generally written to storage 465 as they are collected. To provide 20 seconds of video at a frame rate of 30 fps requires 600 image images; 40 seconds of video requires 1200 images. Using the bracketing method described herein, each of those images are selected from a bracket of images. If each bracket contains five images each, 3000 images must be saved in order to compose 20 seconds of timelapse video. Thus, the images are generally saved to storage 465 as they are acquired rather than holding those images in memory 460.

Once operation image capture has stopped, the stored images are encoded into a movie clip according to a video encoding format, such as one of the MPEG formats. It will be appreciated that other encoding formats, such as HEVC, Dirac, RealVideo, etc., can be used, as known in the art.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more processing units to:
obtain a first plurality of digital images acquired at a first time, each image of the first plurality acquired using different values of an acquisition parameter;
select, from the first plurality of digital images, a first image having an image quality value closest to a first predetermined target image quality value;
obtain a second plurality of digital images acquired at a second time, each image of the second plurality acquired using different values of the acquisition parameter;
select, from the second plurality of digital images, a second image having an image quality value closest to a second predetermined target image quality value; and
combine the selected first image and the selected second image into a timelapse video.

2. The non-transitory program storage device of claim 1, wherein the acquisition parameter is exposure value (EV).

3. The non-transitory program storage device of claim 2, wherein the first plurality of digital images comprises:
an image acquired using an EV equal to $EV_0$, wherein $EV_0$ is calculated by an autoexposure mechanism,
at least one image acquired using an EV greater than $EV_0$, and
at least one image acquired using an EV less than $EV_0$.

4. The non-transitory program storage device of claim 1, wherein the acquisition parameter is white balance.

5. The non-transitory program storage device of claim 1, wherein the first and second target values are selected to minimize flicker in the timelapse video.

6. The non-transitory program storage device of claim 1, wherein the first plurality of images and the second plurality of images each comprise at least five images each.

7. The non-transitory program storage device of claim 1, further comprising a camera, wherein the instructions cause an adjustment of the acquisition parameter between the first and second plurality of images.

8. A computer-implemented method, comprising:
acquiring a first plurality of digital images at a first time, each image of the first plurality acquired using different values for an acquisition parameter;
acquiring a second plurality of digital images acquired at a second time, each image of the second plurality acquired using different values of the acquisition parameter;
calculating a first target image quality value for the first time and a second target image quality value for the second time;
selecting a first image from the first plurality of images with an image quality value closest to the calculated first target image quality value and a second image from the second plurality of images with an image quality value closest to the calculated second target image quality value, and
combining the selected first image and the selected second image into a timelapse video.

9. The method of claim 8, wherein the acquisition parameter is exposure value (EV).

10. The method of claim 9, wherein the first plurality of digital images comprises:
an image acquired using an EV equal to $EV_0$, wherein $EV_0$ is calculated by an autoexposure mechanism,
at least one image acquired using an EV greater than $EV_0$, and
at least one image acquired using an EV less than $EV_0$.

11. The method of claim 8, wherein the first and second target values are selected to minimize flicker in the timelapse video.

12. An electronic device comprising:

an image sensor, a memory operatively coupled to the image sensor, and at least one processor operatively coupled to the memory and the image sensor, wherein the at least one processor is programmed to:

acquire a first plurality of digital images at a first time, each image of the first plurality acquired using different values for an acquisition parameter;

acquire a second plurality of digital images acquired at a second time, each image of the second plurality acquired using different values of the acquisition parameter;

calculate a first target image quality value for the first time and a second target image quality value for the second time;

select a first image from the first plurality of images with an image quality value closest to the calculated first target image quality value and a second image from the second plurality of images with an image quality value closest to the calculated second target image quality value, and combine the selected first image and the selected second image into a timelapse video.

13. The electronic device of claim 12, wherein the acquisition parameter is exposure value (EV).

14. The electronic device of claim 13, wherein the first plurality of digital images comprises:

an image acquired using an EV equal to $EV_0$, wherein $EV_0$ is calculated by an autoexposure mechanism, at least one image acquired using an EV greater than $EV_0$, and at least one image acquired using an EV less than $EV_0$.

15. The electronic device of claim 12, wherein the first and second target values are selected to minimize flicker in the timelapse video.

16. The electronic device of claim 12, further comprising a video encoder.

\* \* \* \* \*